Fig. 5.

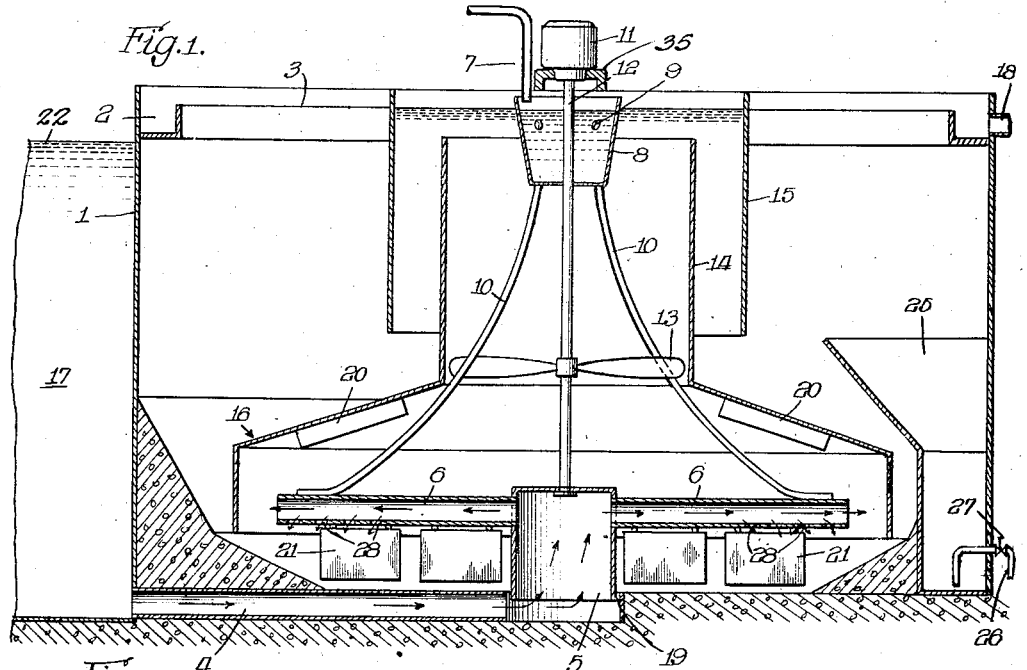
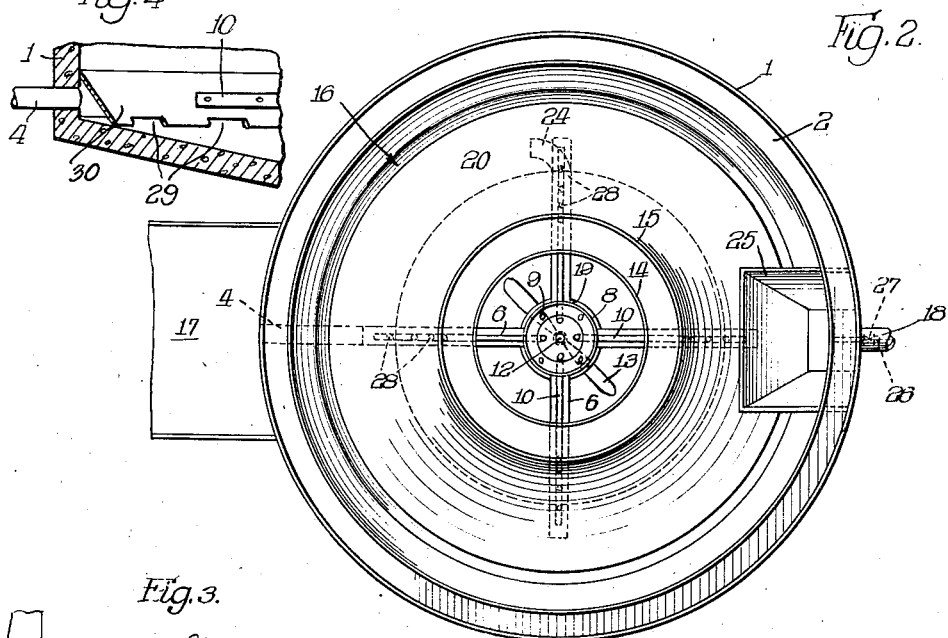
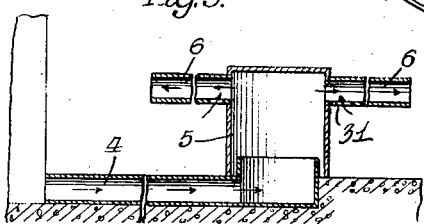

Inventors:
WALTER H. GREEN
JAMES R. BARRINGTON

Patented May 2, 1944

2,348,123

UNITED STATES PATENT OFFICE 2,348,123

TREATMENT OF LIQUID

Walter H. Green and James R. Barrington, Chicago, Ill., assignors to Infilco Incorporated, a corporation of Delaware Application September 13, 1940, Serial No. 356,586

20 Claims. (Cl. 210—16)

This invention relates to the treatment of liquids and more particularly to the treatment of water. The term "water" is used broadly, it being intended to include aqueous liquids in general, such as raw water, process water, sewage and other waste waters, etc. The invention is directed to improvement of the treatment of water and it has for a general purpose the provision of improved method and apparatus therefor. A particular object is to improve the delivery of the water to be treated and of the treating reagents into a treating apparatus and to each other. Another object is to more quickly secure a thorough mixing of the water to be treated and the treating reagents. Another object is to provide for increasing the head at which treated water may be delivered from such apparatus. Other objects will be referred to specifically later or will become apparent from what follows.

One common way of treating water is by the application of lime thereto for the purpose of reducing the hardness of the water and since such treatment is well known, and also because it serves well to set forth the principles involved in our invention and their application, we have chosen to describe our invention as it may be used in softening water by that process. While the softening of water with lime has been used for a great many years, yet within the last few years there have been developed improvements in, or improved ways of carrying out this treatment wherein there is utilized the unsedimented precipitate resulting from previous treatment in carrying out the treatment of subsequent portions of water. Because of the advantages of such a process and its increasing use, and because our invention is particularly advantageous therewith, we have chosen to illustrate our invention in connection with such a process, which is known generally as the accelator process.

An apparatus for carrying out the accelator process is illustrated in sectional view in Fig. 1 hereof, there being shown also the new features involved in our invention. Fig. 2 is a partial plan view of the apparatus shown in Fig. 1, parts being omitted so as to simplify the showing of what is new. Figs. 3 and 4 are modifications of certain parts of Fig. 1. Fig. 5 is a sectional view similar to Fig. 1 but showing a slight modification of construction. Although we are describing our invention in connection with this form of treatment and apparatus it is not our desire or intention to so limit it for obviously it has much wider application.

In carrying out the process referred to, the water is entered into a treating tank and therein is mixed with the treating reagents and a suspension of unsedimented precipitate separating and accumulating from a previously treated water, commonly spoken of as slurry. The mixture is then circulated into another portion of the tank, where treated and clarified liquid escapes from the slurry. The solid particles still kept in suspension in water are returned to the initial mixing space, this circulation and treatment being carried out continuously. One of the advantages of the accelator process is that the treatment is carried out more rapidly because of the way in which the slurry is used. This speeding up of the process permits reduction in size of the necessary apparatus as compared with earlier forms of apparatus used for softening water but even so, because of the large capacity apparatus built wherein many millions of gallons of water are treated per day in a single unit, the apparatus may be of a considerable size. Due to the large size of the apparatus and of the very considerable flow of water therethrough, difficulties are met in the way of securing the necessary thorough and complete mixing of the water and treating reagents in the time available. While small flows of water are comparatively easily and quickly mixed with the necessary dose of treating reagent, the difficulties of such mixing increase rapidly as the volume of flow increases. This rapid increase with increase of volume of flow is because there are grater quantities and weight to be moved and also because the required distance of movement is correspondingly greater so that the difficulties of and requirement for thorough mixing tend to rise as some power of an increased flow and not directly with the volume of such flow. In the past mixing has been had by providing considerable space and allowing long periods with agitation of some kind. Increased violence or velocity of agitation will reduce the required time and space but if carried beyond a certain point will injure the forming precipitate.

It is to be noted that because of other requirements of the accelator process and of other processes that have been proposed, and of the way these processes are most advantageously carried out, the chamber or space in which this necessary mixing takes place is not of the most advantageous shape, being in general of relatively considerable cross-sectional area as compared with its height or depth—that is, the mixing is commonly carried out in a relatively broad and shallow chamber or space which may occupy the whole bottom area of the treating tank, so that difficulties caused by distance in mixing are still further increased. One of the objects of this invention is to provide improved means by which both the water and reagents may be distributed and mixed over a considerable area.

In Fig. 1 the numeral 1 indicates a treating tank having the overflow launder 2 which establishes a water level at 3 within the tank. Water to be treated enters through inlet conduit 4 from basin 17 in which the water level may be at 22. Within tank 1 and at the central portion thereof is a drum 5, the open lower end of which extends into the end of conduit 4 which may be suitably enlarged for the purpose. From the upper part of drum 5 extend radial arms 6 shown open at the outer ends, and the drum and arms are attached to and are rotated by and may be supported by a shaft 12 turned by power member 11 at a suitable speed. The power member 11, which may be a motor-reducer as shown, can be supported by any suitable means such as the beam 35. The weight of shaft 12 and of the members supported thereon may be carried by a suitable thrust bearing, not shown, in the motor-reducer 11, such as that commonly provided in motor reducers on the outlet shaft for the purpose of supporting loads. It will be apparent that on the rotation of shaft 12 and therewith of arms 6, and due to the centrifugal force set up, water will be drawn up from inlet conduit 4 through drum 5 and discharged out the open ends of arms or pipes 6, any suitable number of these pipes being provided. It will be apparent that, depending upon the velocity of arms 6, a discharge head is created whereby the water level 3 in tank 1 may be at or above the water level 22 in supply tank 17. In softening apparatus of the older conventional type the peripheral speed of the agitator or any other moving part that is used for stirring, is commonly limited to under 3 feet per second because at higher velocities the suspended particles are apt to be disintegrated and the same limitation exists as to apparatus used for other treatments, as for instance the coagulation and clarification of muddy water or sewage. We have found, however, that if the slurry containing old precipitate is properly circulated and agitated, as for instance in the accelator process above referred to, then much higher velocities not only may be used but are in many cases advantageous, and peripheral velocities of 10 feet per second and more may be used. Such velocities will provide for a substantial increase of head. This is a very advantageous feature of the invention for it provides means for overcoming loss of head due to friction, which loss sometimes causes serious difficulties in treating plants, or even to go further than to overcome loss due to friction and actually increase the head within tank 1 over that of the supply. While increase of head is sometimes advantageous it is not always necessary as frequently the supply is under sufficient head and the other advantages of our invention may be realized without it. It will be understood, of course, that tank 17 is not necessary, and that the supply through inlet conduit 4 can come from any suitable source.

As shown in Fig. 1, the arms 6 have attached to them the members 21. These members 21 may be in the form of plates or blades and are shown hinged as at 28 so as to have some degree of flexibility. These blades may serve a double purpose. They can be of a relatively large area so as to add to the agitation provided by the arms 6 on rotation. It is intended also that they may serve to move solids that may have settled to the floor of the tank. The settled solids may be moved to a discharge outlet or they may be moved simply to resuspend them. When such a treating plant is shut down for any reason, the solids in suspension settle to the floor and since the amount of solids in suspension in the slurry is considerable, the depth of deposited solids may be considerable. It may be desirable in such apparatus that the revolving arms be quite close to the floor, or, if the arms be spaced higher, then scraper blades be attached to them extending down to adjacent the floor to move solids deposited thereon. In some cases, such as during a period of shutdown, the solids deposited form such a deep layer that the arms become wholly or partially imbedded and the resistance of the deposit is so great that on attempted resumption of operation the motor will stall and perhaps burn out, or some part of the structure be broken. It has been necessary in some cases with an agitator near the floor to empty the treating basin and shovel or flush out settled solids before operation could be resumed. Of course, the arms may be spaced higher above the floor, but this may not give proper agitation and also may simply postpone trouble until deposited solids accumulate after several shutdowns, to imbed the arms. By providing the flexible blades 21, the arms 6 may be at any desired elevation and while the lower edges of the blades may be imbedded, yet when rotation of shaft 12 is again started, these members simply trail back and thus will be extracted readily, after which with continued rotation they will by their weight or elasticity work down through and resuspend the solids. This not only prevents the difficulty spoken of above but permits the accumulation in the apparatus of any desired amount of solids for the slurry and its resuspension after a shutdown.

In the upper part of tank 1 and mounted on shaft 12 so as to revolve therewith, is a cup 8 shown as having the top edge thereof above liquid level 3 and provided with openings 9 below the liquid level. Treating reagent is delivered into cup 8 through pipe 7. From the lower parts of cup 8 delivery pipes 10 are carried downwardly and outwardly so as to preferably have their discharge ends adjacent the discharge ends of pipes 6. Instead of the pipes 10 being carried out as just referred to, they may extend downwardly and discharge either directly into pipes 6, which connection is not shown, or into rotating drum 5 and thence into pipes 6, as indicated by 23, in Fig. 5.

It will be apparent that on rotation of shaft 12 and cup 8 therewith, the reagents, which normally enter through pipe 7 in liquid form, may be carried downwardly and outwardly and discharged in a corresponding path and manner at about the same point where the water is discharging from pipes 6; or, if pipes 23 are used instead of delivery pipes 10, the reagents will be discharged out of pipes 6 with the water. Obviously, any desired number of pipes 10 may be used, and each pipe may have a plurality of spaced discharge openings or have branches, or both. By such means, that is, by the spacing of the discharge openings on rotating arms, the reagent can be distributed where desired, as, for instance, uniformly distributed over the whole bottom or any annular portion thereof. It will thus be apparent that means are provided whereby both the water and the reagents may be evenly distributed around the whole circumference and over the whole area of the space being utilized, and delivery of the two is made simultaneously and as close together as desired and in relatively small volume at each point so that quick and intimate mixture is obtained. It will be understood, of course, that the number and size of pipes 6 and 10 and their radial length will be adapted to the size of the space into which the liquid is to be discharged, and other similar considerations.

The accelator apparatus may take a variety of forms in which a basin is divided by suitable partitions or baffles into a mixing and reaction zone and a clarification zone, but as commonly constructed comprises a hood member 16 under which the water to be treated usually enters and under which the treating reagents are ordinarily introduced. From the top of this hood member and at the center thereof, there extends a cylindrical conduit 14 in which is a propeller member 13 mounted on shaft 12 to revolve therewith. Cylinder 14 does not extend up to the water level in tank 1 and is surrounded by another cylinder member 15, the top of which is above the water level and the bottom spaced above the hood 16. Assuming the tank to be filled with water and shaft 12 to be revolving, it will be apparent that due to the action of propeller 13 circulation will be created from under the hood 16 up through inner cylinder 14 and down through outer cylinder 15 and across the top of hood 16 to return under the hood through the annular opening around its lower edge. As is well known in the art, in carrying out the treatment in the accelator the liquid comprised in this circulation is a suspension or slurry containing solid particles previously precipitated, and the action of which is desirable in carrying out the treatment. Clarified water escapes from the top of the slurry over the top of hood 16 and rises to escape over the edge of launder 2. It will be seen that with such operation the space under the hood surrounding members 5 and 6 and also in the top of cylinder 15 surrounding cup 8 will be filled with slurry. It will be observed that in Fig. 1 an opening 19 has been provided between the wall of conduit 4 and cylinder 5. This permits some of the slurry to be drawn into the entering raw water by the centrifugal action of arms 6 and mixed therewith before the raw water is discharged into the space under the hood. This is very desirable under certain conditions and particularly so even to the point of necessity if the treating reagents are delivered into pipes 6 through pipes 23. The presence of a sufficient amount of old particles carried in the slurry will prevent deposit adhering to the walls of arms 6 as may otherwise occur if the treating reagents meet the raw water within these pipes. Depending upon the nature of the solid particles in the slurry, it may be undesirable to provide space 19 as indicated in Fig. 1, as this may permit heavy particles to enter conduit 4 and cause clogging. Stirrers can be provided on rotating member 5 to overcome this, or the end of conduit 4 may extend above the floor of the tank as illustrated in Fig. 3, and the member 5 may extend down outside the walls of inlet conduit 4 so as to form a sort of seal to prevent the entrance of slurry. If this is done, it may be desirable to provide, in either rotating drum 5 or arms 6, openings 31 to permit the entrance of slurry into the incoming water. These openings are desirably in pipes 6 and at a suitable distance from the top of member 5 so that solids will not settle back into inlet 4.

In thus providing for entry of slurry into arms 6 we not only have in mind securing admixture of slurry with the entering water but also adding to or increasing the circulation of the slurry itself by drawing it into such arms at or adjacent the center and discharging at radially outward points, thus aiding both circulation and mixing.

As described above, the top of cup 8 is above the liquid level, and with this construction it is desirable to cut openings 9 in the walls of cup 8 below the liquid level 3 so as to permit slurry to enter into this cup where it is mingled with the reagents entering through chemical feed pipe 7. This has several desirable effects—one that it tends to prevent incrustation of pipes 10 or 23, and by diluting and increasing the volume of the reagents added, it aids the subsequent distribution and the mixing with the water undergoing treatment and also the solids so present promote the reactions that occur when the reagents are mixed with the raw water. If the openings 9 and pipes 23 are made of sufficient size, then openings 19 or 31 may be omitted. While preferably the upper edge of cup 8 is above the liquid level 3 in order to prevent any overflow of reagents from cup 8, this is not absolutely necessary and the top edge of cup 8 can be a little below the liquid level 3—in which case the openings 9 can be omitted. With proper proportioning of the size of pipes 10 and of openings 9 there will be no escape of liquid out through openings 9 because of inflow through chemical feed pipe 7 when the plant is in operation, but instead a continuous inflow through openings 9 due to the pump action of arms 10, or the joint action of arms 6 and conduit 23, and similarly this pump action will tend to cause a continuous inflow over the top edge of cup 8 if this is submerged, the level in cup 8 during operation being constantly below level 3.

Baffles 20 are indicated attached to the underside of hood 16, these being for the purpose of preventing undue rotational movement of liquid under the hood, the number and size of those provided being adapted to the size of the apparatus and the rotational speed of arms 6.

In carrying out the treatment of water where a slurry of old particles is used it is necessary not only to get a complete mixture of the water and reagents but also to mix thoroughly with the slurry. It is very desirable that the water or the reagent or both be disseminated through a considerable volume of slurry prior to or at least simultaneously with their mixing together so that all reactions will take place in the presence of a considerable amount of old solids. The method we propose and the apparatus therefor are admirably adapted to secure these results and particularly so with large flows. Instead of following the usual practice of flowing the water in at one point and the reagent at another and then moving both for mixture with each other and the slurry we provide shifting inlets for both whereby both are delivered into the treating space and the slurry therein as juxtaposed rings or sheets so that but a small amount of local motion or agitation is necessary for complete mixing of all three. The result is a general mixing and a most favorable condition for reaction so that there may be a saving of time, of space and of power required as well as improved treating results.

It will be apparent that the action of drum 5, arms 6, openings 19, cup 8, and chemical conduits 10 and 23 is not influenced by the presence or the absence of hood 16, cylinders 14 or 15 or the propeller 13 except that if these are omitted there would not be slurry up around cup 8, but instead clarified water would be drawn in through openings 9. It is thus apparent that very considerable modification of such parts of the apparatus may be made or that they may be omitted entirely, and we contemplate such modifications and omissions. However, any such modifications or omissions may make it necessary or desirable to make corresponding modifications in other parts of the apparatus. Thus, if the hood 16 were omitted, it probably would be desirable to modify the manner in which the incoming water is discharged from pipes 6. Such modifications might, for instance, be the bending of the ends of the pipes as indicated on upper pipe 6 at 24 in Fig. 2. It may, and probably will be, desirable in such case not to discharge the flow from pipes 6 in one stream but to subdivide the discharge into a plurality of streams by means of a plurality of small openings. At 28 in Fig. 2 are indicated a series of radially spaced openings in an arm 6. The openings 28 are shown on the underside of the arms but they may be anywhere on the circumference although preferably not on the front of the arms. With such openings, distribution of water can be over any desired portion or area of the floor of the tank. When such openings are used, the end opening of pipe 6 should be closed or at least restricted. It is obvious that the delivery of reagents may be of corresponding pattern by arrangement of outlet openings in pipes 10, this distribution of reagents being much facilitated by the dilution of the reagents with slurry as above referred to. Furthermore, the number of and size of baffles 20 will probably be increased so as to prevent the rotation and agitation which is desirable in the lower part of the tank from extending into the upper part thereof.

The solids which are carried in with the raw water or formed as a result of the treatment, and which accumulate in the circulating slurry, may advantageously be removed by providing what we will refer to as a concentrator 25 as shown at the right hand side of Fig. 1 and Fig. 2. This concentrator chamber, as shown, is more or less in the form of a truncated pyramid, the bottom of which is at about the bottom of tank 1 and the top at a level adjacent that of the bottom edge of cylinder 15.

In a process of this kind the top level of the slurry is quite sharply defined, and the top edge of the concentrator 25 is placed at about the upper level of slurry that it is desired to maintain. Solids drifting over this chamber 25 will subside therein and concentrate to an extent depending upon their nature and the time of retention therein. From the bottom of chamber 25 they may be discharged through a blowoff pipe 26 controlled by a valve 27. Such discharge may be either continuous or it may be intermittent, and it may be either manually or automatically controlled. Such a concentrator is not necessarily located at the side of the tank but it may be located in the central portion of the tank and be supported there by the baffle members 20 which in turn may be wholly or partly carried on the walls of tank 1, or it may be outside of tank 1 but connected thereto, and it may take various forms.

It will often not be necessary to develop any head by the rotation of arms 6 to induce delivery of water into the apparatus, but there will be ample head available in conduit 4. In such case, and in order to prevent leakage it may be desirable to make a fairly tight joint between drum 5 and conduit 4. However, it is not ordinarily necessary to entirely prevent leakage at this point. When no increase of head is sought through the action of arm 6 then there may be operation at much lower angular or peripheral velocities and in such cases the operation of blades 21 is of value in securing the desired agitation.

In some cases, especially in very large tanks the water to be treated may be brought in through stationary conduits. Such stationary conduits may discharge water into the tank through annularly or peripherally disposed openings, for instance in the manner shown in Fig. 4 wherein the said openings are shown as 29. As shown in this figure, the inlets 29 may be set in an annular plate 30, thereby forming an annular distributor around the tank, communicating with inlet conduit 4 and with the tank through the plurality of openings 29. Obviously, the number, size, shape and position of such conduits and openings may be made such as to give any desired pattern of distribution of the entering raw water. A single annular distributor 30 with openings as indicated in Figure 4 has been used in apparatus ranging in capacities up to ten million gallons per day and has been found very satifactory. Obviously also, the number and size of the reagent inlet pipes 10 and the position of their outlet openings, taken with the rotational speed of shaft 12, can be made to give any desired distribution of the reagent relative to the inflow stream or distribution of raw water. Such a combination will produce conditions substantially the same as when the rotating pipe 6 is used, except that no increase of head can be had, such increase of head being a particular purpose of the rotating distributor.

In cases where it is desired to have an extra large circulation of slurry, more than can be had without undue velocity of the arms or undue size or number of arms, or where a higher velocity of flow through the arms is desired, as for instance, to prevent deposit of solids therein, additional means may be provided to cause flow through the arms. Thus a propeller or impeller of some kind could be associated with, for instance, the drum 5 to cause greater flow of velocity than the rotation alone would give.

The principles involved in our invention will be readily understood from the description which precedes, but it must be understood that many further modifications in detail or arrangement may be made.

We claim:
1. In apparatus of the kind described including the combination of a treating basin, means for withdrawing treated water from the upper portion of said basin and means for withdrawing solids from said basin, a rotary water distributor located in the lower portion of said basin and adapted on rotation thereof to distribute incoming water annularly over the floor of said basin, an inlet for water to be treated communicating with said rotary water distributor, rotary reagent delivery means mounted to rotate with said water distributor and deliver reagent adjacent to the distributor, means for delivering reagent to said rotary reagent delivery means, and means to rotate said rotary distributors.

2. In a water treating apparatus comprising a treating basin wherein water to be treated is dosed with a treating reagent, said basin being provided with an outlet from the upper part thereof, an improved means for delivering and mixing the raw water and the reagent in the said basin comprising a raw water inlet in the lower portion of said basin and so constructed and arranged as to deliver incoming raw water annularly into the lower portion of said basin, a reagent inlet in the lower portion of said basin so constructed and arranged as to deliver a treating reagent annularly into the lower portion of said basin and in spaced relationship to the annular inflow of raw water, means for mixing said water and reagent in the lower portion of said basin comprising a rotatable shaft, an agitator member and at least one of said inlet members being carried by and extending from said shaft, and means for causing rotation of said shaft.

3. The apparatus of claim 2 wherein the agitation member carries agitator blades flexibly suspended therefrom.

4. A water treating apparatus comprising in combination a treating basin, partition means in said basin so constructed and arranged as to divide the basin into an upper quiescent zone and a lower agitation zone, an outlet for treated water from the upper portion of said quiescent zone, a rotatable shaft extending vertically in the central portion of the basin, means for causing rotation of the said shaft, a raw water distributing conduit terminating in the lower portion of said basin mounted upon said shaft to rotate therewith, an inlet for raw water communicating with said distributing conduit, a reagent delivery conduit terminating in the lower portion of said basin and mounted upon said shaft to rotate therewith, means to deliver reagent to said reagent conduit, and a solids outlet from said basin.

5. The apparatus of claim 4 wherein the reagent conduit is so joined to the raw water conduit as to deliver reagent thereinto.

6. The apparatus of claim 4 wherein an opening is provided for ingress of previously treated water carrying solids in suspension into the rotatable raw water conduit, and wherein the means for causing rotation of the shaft is adapted to rotate said shaft at a speed sufficient to impart a substantial outward motion to the water entering the conduit.

7. The apparatus of claim 4 wherein there is provided an opening for ingress of water from within the treating basin into said reagent conduit.

8. The apparatus of claim 4 wherein the rotatable raw water conduit carries blades pivotally suspended therefrom.

9. The apparatus of claim 4 wherein the rotatable raw water conduit has a plurality of discharge openings.

10. The apparatus of claim 4 having associated therewith a partition means forming a solids concentrating chamber, an inlet from said basin into said chamber at a point substantially above the floor of said basin, and a discharge to waste from the lower portion of said chamber.

11. In a water treating apparatus wherein the water to be treated is dosed with a treating reagent in a treating basin, an improved means for mixing water and reagent in said basin comprising an inlet for delivering incoming raw water annularly into the bottom portion of the basin, a rotatable reagent delivery member having an outlet positioned to deliver reagents within said basin in an annular path corresponding to that of incoming raw water, means for delivering a treating reagent into said rotatable reagent delivery member and power driven means joined to said reagent delivery member to rotate the same.

12. In the treatment of water with a precipitate forming reagent, the improved method of delivering and mingling the raw water and the reagent which comprises simultaneously delivering the raw water and the reagent in the form of separate streams entering a body of water undergoing treatment over matching portions of adjacent annular paths whereby an initial distribution and mixing of the newly entering water and reagent with and in water undergoing treatment is obtained, and imparting mechanical rotational agitation to the initial mixture and water undergoing treatment whereby the initial mixture of raw water, reagents and water undergoing treatment is subjected to further periods of agitation wherein they may be completely and intimately intermixed.

13. The process of claim 12 wherein the incoming treating reagent is diluted in its path of flow with water already undergoing treatment whereby the volume of reagent as delivered to the raw water is substantially increased.

14. In the treatment of water with a precipitate forming reagent in which the reaction between the reagent and the raw water takes place in the presence of a concentrated and turbulently circulating slurry containing particles separated and accumulated from previously treated water, the method of mixing raw water and reagent in and with said slurry which comprises simultaneously delivering the raw water and the reagent into the slurry in separate streams flowing in matching annular paths while subjecting the whole mass including the preliminary mixture so obtained to continued rotational and turbulent agitation.

15. The apparatus of claim 2 wherein the raw water inlet comprises a fixed annular conduit member provided with at least one outlet opening positioned to discharge incoming raw water over the basin floor, and the reagent inlet is carried by the rotatable shaft.

16. The apparatus of claim 2 wherein both the raw water and the treating reagent inlets are carried by and extend from the rotatable shaft.

17. In water treating apparatus comprising a treating basin and an outlet means from the upper portion of said basin, an improved inlet means for water and reagent comprising an inlet conduit for delivering incoming raw water to within the basin, an opening from said inlet conduit discharging into said basin, said conduit and opening being so constructed and positioned as to discharge incoming water annularly over the floor of said basin, an inlet conduit for a treating reagent, an opening into said basin from said reagent inlet conduit, said reagent inlet conduit and opening being so constructed and arranged as to discharge treating reagent annularly in said basin adjacent to the inlet flow of raw water into said basin, at least one of said inlet conduits being mounted for rotation within said basin, and means for rotating said rotatable inlet conduit.

18. In a liquid treating apparatus including a mixing and reaction basin, an improved means for delivering and mixing the liquid to be treated and a treating reagent comprising the combination of means for simultaneously delivering liquid to be treated and a treating reagent in the form of separate and adjacent streams each entering in an annular path of inflow, said paths lying in predetermined spaced relation to the floor of said tank, and a rotatable agitator mounted for rotation in a horizontal path adjacent to said annular paths of inflow of liquid and reagent.

19. In a water treating apparatus including a basin wherein the water to be treated is dosed with a treating reagent and an outlet means from the upper portion of said basin, an improved means for mixing water and reagent therein comprising means for delivering incoming raw water annularly into the bottom portion of the basin, a rotatable reagent delivery member having an outlet positioned to deliver reagents within said basin in an annular path corresponding to that of incoming raw water, means for delivering the treating reagent into said movable reagent delivery member and power driven means joined to said reagent delivery member to rotate the same.

20. In a liquid treating apparatus including a reaction basin wherein the water to be treated is dosed with a treating reagent, a treated liquid outlet from the upper portion of said basin, and a solids outlet from said basin, an improved means for delivering and mixing the water to be treated and a treating reagent comprising the combination of inlet means for simultaneously delivering raw water to be treated and a treating reagent in the form of separate streams each entering in an annular path of inflow, said paths lying adjacent to one another and in spaced predetermined relation to the floor of the tank, a vertical shaft in said tank, an agitator member mounted on said shaft at a level adjacent the level of said inlet means, and means for rotating said shaft.

WALTER H. GREEN.
JAMES R. BARRINGTON.